Figure 1:
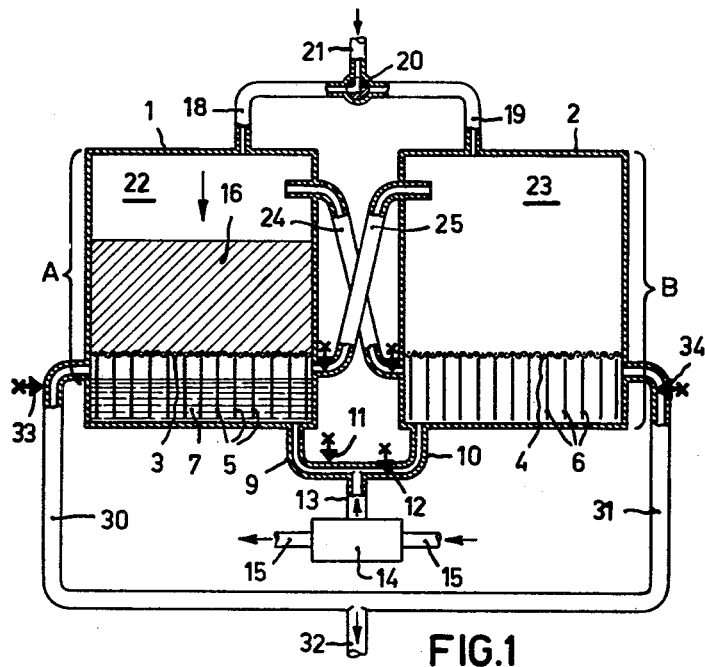

Nov. 17, 1964  H. C. J. VAN BEUKERING  3,157,480
DEVICE FOR SEPARATING OUT IN THE SOLID STATE
COMPONENTS FROM A GAS MIXTURE BY COOLING
Filed April 25, 1961 2 Sheets-Sheet 1

INVENTOR.
HENRICUS C. J. VAN BEUKERING
BY
AGENT

United States Patent Office 3,157,480
Patented Nov. 17, 1964

3,157,480
DEVICE FOR SEPARATING OUT IN THE SOLID STATE COMPONENTS FROM A GAS MIXTURE BY COOLING
Henricus Cornelis Johannes van Beukering, Emmasingel, Eindhoven, Netherlands, assignor to North American Philips Company, Inc., New York, N.Y., a corporation of Delaware
Filed Apr. 25, 1961, Ser. No. 105,352
Claims priority, application Netherlands May 6, 1960
2 Claims. (Cl. 55—269)

The invention relates to a device for separating out, in the solid state, constituents from a gas mixture by cooling, in which at least two separators are provided, which are provided each with a gas supply duct and a gas outlet duct and in each of which is arranged between the inlet duct and the outlet duct a support which allows the gas to pass, for example a gauze partition, which is connected with a cooling device so that the constituents can be deposited like snow on the support.

Such a device is known and may be used, for example, for separating out water and carbon dioxide from air, guided towards a cold wall of a cold gas refrigerator, where it condenses into liquid air. The separation of water and carbon dioxide has the advantage that the condensed liquid air is not cloudy.

Such a device may, however, also be used in gas fractionating systems, in which the separation of the said constituents may be desirable, since they may obstruct ducts in heat exchangers and gas fractionating columns by the formation of ice.

A known separating device is one in which one separator may be freed from snow and ice formed therein, whereas the other remains operative as a separator.

A separator of the kind set forth requires a starting time, particularly when the support allowing the gas to pass and used for the snow to be separated out consists of gauze, before the separation operation is at a maximum. The separator permits a small quantity of moisture and similar impurities to pass through during starting time.

The invention has for its object to avoid the abovementioned disadvantage.

In accordance with the invention the two separators are adapted to be changed over and coupled so that they can be operative either separately or in series, in which latter case the ducts are such that the gas mixture passes through a snow-free separator and then through a separator filled wholly or partly with snow.

During the starting time of a purified separator the gas mixture may be guided through the series-connected separators, i.e., first through the purified separator and then through the second separator filled wholly or partly with snow.

The gas mixture then arrives in a completely dry state and freed from impurities out of the device according to the invention so that, for example, when this device conveys air to be condensed to a cold-gas refrigerator, the latter is capable of operating continuously and of supplying constantly clear, liquid air.

In a practical embodiment of the invention the separators consist of vessels, on the bottom of which a cooling liquid can be provided to cool the support, the level of the liquid in the vessels being controllable, the vessels communicating with each other through ducts, each of which connects a space in a vessel above the support therein with a space in the other vessel underneath the support thereof.

The invention will now be described more fully with reference to one embodiment shown diagrammatically.

The drawing shows in the four figures, FIG. 1–FIG. 4, four successive stages of the device.

The device comprises two separators A and B, each consisting of a housing 1 and 2 respectively, in which a partition 3, 4 respectively, for example a gauze partition allowing gas to pass is provided. The partitions 3 and 4 can be cooled strongly, since extensions 5 and 6 of the partitions are provided to extend in liquid gas 7 and 8 respectively provided on the bottom of the housings 1 and 2 via ducts 9 and 10 respectively, which include cocks or the like 11 and 12 respectively and are connected with a supply duct 13, emanating from a level controller 14 in a liquid duct 15.

On the partitions 3 and 4 snow layers 16 and 17 can be formed, which contain impurities such as water and carbon dioxide separated out by freezing from a gas mixture introduced into the housings 1 and 2 through ducts 18 and 19.

The ducts 18 and 19 communicate through a cock 20 with the supply duct 21 for gas to be purified.

The spaces 22 and 23 above the partitions 3 and 4 in the housings 1 and 2 communicate through ducts 24 and 25 with the spaces 26 and 27 below the partitions 3 and 4. In the ducts 24 and 25 provision is made of stopping valves 28 and 29 respectively.

The spaces 26 and 27 below the partitions 3 and 4 have outlet ducts 30 and 31 for purified gas mixture, leading to a collecting duct 32 for purified gas mixture.

The ducts 30 and 31 include stopping valves or cocks 33 and 34.

When the various cocks occupy the positions shown in the various figures, the process is as follows:

(a) As is shown in FIG. 1, a gas mixture flows through the duct 21, the cock 20, the duct 18, the space 22, the snow layer 16, the partition 3, the duct 30 towards the duct 32. The separator B is switched completely out of the flow of gas and may, for example, be cleaned thoroughly.

Figure 2:
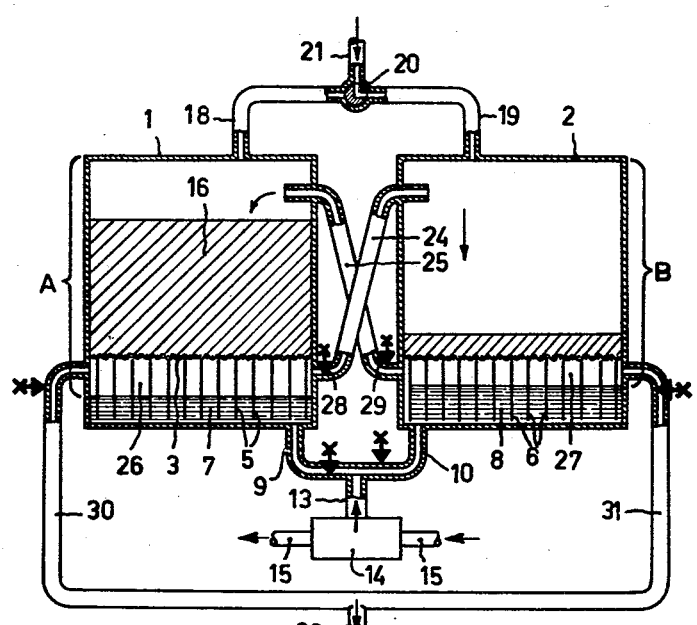

(b) As is shown in FIG. 2, a gas mixture flows through the duct 21, the cock 20, the duct 19, the space 23, the partition 4, the space 27, the duct 24, the space 22, the partition 3, the space 26, the duct 30 towards the duct 32. In both separators liquid gas is now available on the bottom as a cooling agent for the partitions 3 and 4. The two separators are thus traversed in series.

Figure 3:
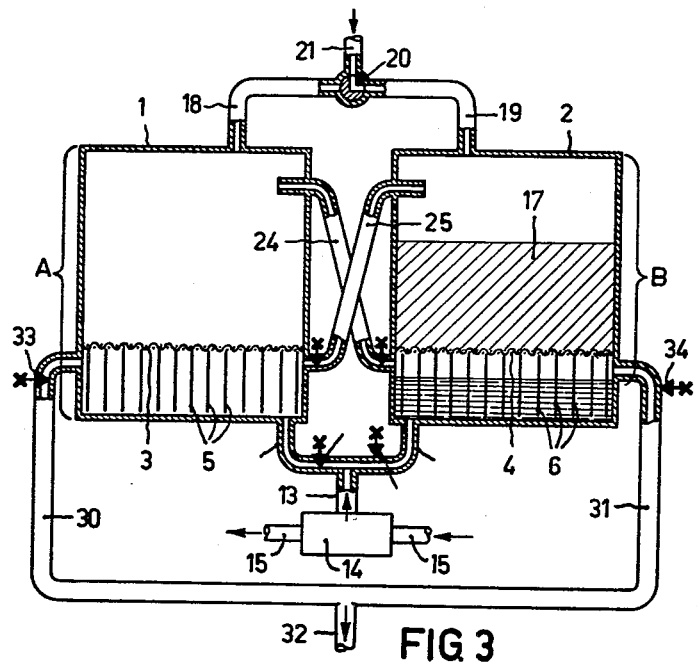

(c) As is shown in FIG. 3, the left-hand separator A is switched off completely, whereas the separator B is completely active in the path for the gas to be purified. The separator A may be cleaned.

Figure 4:
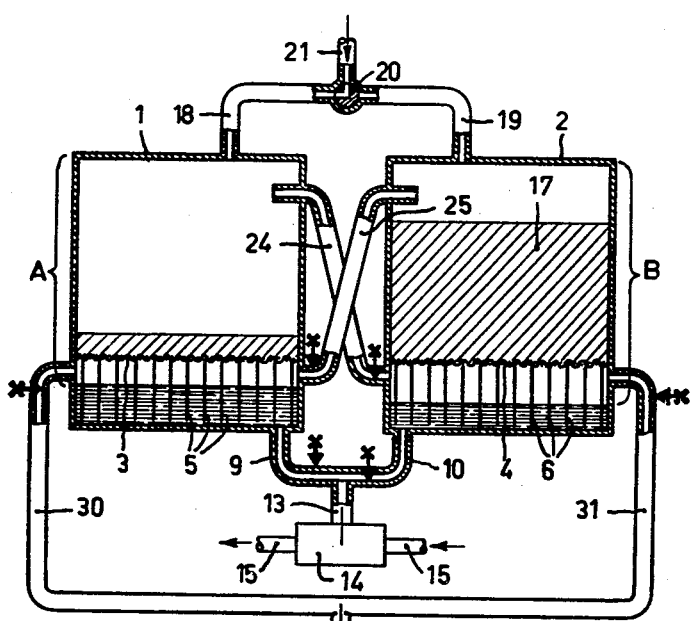

(d) As is shown in FIG. 4, the separators A and B are traversed in series. The separator A beginning to start. The partition 3 in the separator A is strongly cooled. The liquid level on the botom of this separator is then high. The cocks or valves may be actuated manually or automatically.

What is claimed is:

1. A device for separating out impurities in a solid state by cooling a gas mixture, comprising at least two separators, each of said separators having an inlet duct and an outlet duct, a gas permeable partition in each separator located between said inlet and outlet ducts for dividing each said separator into a first chamber adjacent and connected with said inlet duct and a second chamber adjacent and connected with said outlet duct, a cold source operatively connected to the second chamber of each separator, extensions attached to said partition of each separator and extending away from said partition for physical contact with the cold source of the separator, whereby the impurities to be separated out are deposited on a selected partition in the form of a snow layer which gradually enlarges, first valve means in said inlet and outlet ducts of each separator whereby said separators may be operated alternatively, two connecting ducts, one of said connecting ducts connecting the first chamber of one of said separators with the second chamber of the other of said separators, the other of said connecting ducts connecting the first chamber of said other of said separators with the second chamber of said one of said separators, and second valve means in said connecting ducts, said first and second valve means being operative to pass said gas mixture through said two separators in series.

2. A device for separating out impurities in a solid state by cooling a gas mixture as claimed in claim 1 wherein said separators each have a vertical axis, said partitions are substantially horizontal and said extensions depend downwardly from said partitions.

References Cited in the file of this patent

UNITED STATES PATENTS

| | | |
|---|---|---|
| 2,523,793 | Vance | Sept. 26, 1950 |
| 2,777,299 | Shaperdas | Jan. 15, 1957 |
| 2,999,364 | Hellingman et al. | Sept. 12, 1961 |

FOREIGN PATENTS

| | | |
|---|---|---|
| 275,633 | Great Britain | Dec. 3, 1928 |
| 554,358 | Great Britain | June 30, 1943 |
| 634,466 | Germany | Aug. 28, 1936 |
| 832,600 | Germany | Feb. 25, 1952 |